United States Patent
Romaszko et al.

(10) Patent No.: US 12,489,456 B2
(45) Date of Patent: Dec. 2, 2025

(54) RELATING TO METHODS FOR DIGITAL TO ANALOGUE CONVERTERS IN SURFACE ION TRAPS

(71) Applicants: Universal Quantum Ltd, Brighton (GB); University of Sussex, Brighton (GB)

(72) Inventors: Zak David Romaszko, Brighton (GB); Iain McIntosh Hunter, Brighton (GB); Harold Godwin, Brighton (GB)

(73) Assignees: Universal Quantum Ltd, Brighton (GB); University of Sussex, Brighton (GB)

( * ) Notice: Subject to any disclaimer, the term of this patent is extended or adjusted under 35 U.S.C. 154(b) by 72 days.

(21) Appl. No.: 18/400,354

(22) Filed: Dec. 29, 2023

(65) Prior Publication Data
US 2024/0214001 A1    Jun. 27, 2024

Related U.S. Application Data

(63) Continuation of application No. PCT/GB2022/051688, filed on Jun. 30, 2022.

(30) Foreign Application Priority Data

Jun. 30, 2021  (GB) .................................. 2109471

(51) Int. Cl.
*H03M 1/66* (2006.01)
*G06N 10/40* (2022.01)
(Continued)

(52) U.S. Cl.
CPC .............. *H03M 1/66* (2013.01); *G06N 10/40* (2022.01); *G06F 1/04* (2013.01); *G06F 1/08* (2013.01); *G06N 10/20* (2022.01)

(58) Field of Classification Search
CPC ......... H03M 1/66; G06N 10/40; G06N 10/20; G06F 1/04; G06F 1/08
See application file for complete search history.

(56) References Cited

U.S. PATENT DOCUMENTS

2024/0355495 A1 * 10/2024 Repp ..................... H03M 1/662

FOREIGN PATENT DOCUMENTS

EP        3839980 A2    6/2021
WO   WO-2022123268 A2   6/2022
(Continued)

OTHER PUBLICATIONS

Akhtar, M. et al. A high-fidelity quantum matter-link between ion-trap microchip modules. arXiv preprint arXiv:2203.14062v1 (Mar. 26, 2022). 8 pages.
(Continued)

*Primary Examiner* — Joseph J Lauture
(74) *Attorney, Agent, or Firm* — Wilson Sonsini Goodrich & Rosati

(57) ABSTRACT

A surface ion trap comprising a plurality of electrodes and DACs, each electrode being controlled by a DAC, wherein a first set of DACs control the electrodes configured to trap an ion in a first area and a second set of DACs control the electrodes configured to trap an ion in a second area wherein the first set of DACs are configured to operate with low noise and low bandwidth and the second set of DACs are configured to operate with a high bandwidth and high noise.

15 Claims, 6 Drawing Sheets

(51) Int. Cl.
  *G06F 1/04* (2006.01)
  *G06F 1/08* (2006.01)
  *G06N 10/20* (2022.01)

(56) References Cited

FOREIGN PATENT DOCUMENTS

WO   WO-2022123269 A1   6/2022
WO   WO-2023275556      1/2023

OTHER PUBLICATIONS

Akhtar, M. et al. A high-fidelity quantum matter-link between ion-trap microchip modules. arXiv preprint arXiv:2203.14062v2 (Apr. 5, 2022). 8 pages.
Akhtar, M. et al. A high-fidelity quantum matter-link between ion-trap microchip modules. arXiv preprint arXiv:2203.14062v3 (Nov. 20, 2022). 10 pages.
Akhtar, M. et al. A high-fidelity quantum matter-link between ion-trap microchip modules. Nature Communications 14(1):531, 1-8 (2023).
GB2109471.9 Office Action with Search Report dated Nov. 17, 2021.
Lekitsch, Bjoern, et al. Blueprint for a microwave trapped ion quantum computer. Science Advances 3.2 (2017): e1601540. 11 pages.
PCT/GB2022/051688 International Preliminary Report on Patentability dated Jan. 11, 2024.
Shen, Yi et al. A reconfigurable 10-to-12-b 80-to-20-MS/s bandwidth scalable SAR ADC. IEEE Transactions on Circuits and Systems I: Regular Papers 65.1 (2017): 51-60.
Stuart, J. et al. Chip-integrated voltage sources for control of trapped ions. Physical Review Applied 11(2):024010, 1-7 (2019).
Geck, Lotte, et al. Control electronics for semiconductor spin qubits. Quantum Science Technology, vol. 5, 1-18 (2020).
Kaushal, V., et al. Shuttling-based trapped-ion quantum information processing. AVS Quantum Science, vol. 2, 1-25 (2020).
PCT/GB2022/051688 International Search Report and Written Opinion dated Jan. 5, 2023.

\* cited by examiner

RELATING TO METHODS FOR DIGITAL TO ANALOGUE CONVERTERS IN SURFACE ION TRAPS

CROSS-REFERENCE

This application is a continuation of International Application PCT/GB2022/051688, filed Jun. 30, 2022, which claims the benefit of G.B. Application No. 2109471.9, filed Jun. 30, 2021, which applications are each incorporated herein by reference in their entireties.

FIELD

The present invention relates to improvements in or relating to quantum computing, and in particular, to improved Digital to Analogue Converters (DACs) for optimised surface ion traps.

BACKGROUND

Quantum computing in general, unlike so-called "classical computing", relies on the quantum mechanical properties of particles or matter to produce or alter data. The data may be represented by quantum bits or "qubits", which is a two state quantum mechanical system. Unlike classical computing, the qubit may be in superposition of quantum states. Another feature of quantum computing is the entanglement between qubits in which the state of one particle or atom is influenced by another particle or atom.

Quantum mechanical qubits are able to encode information as combinations of zeros and ones simultaneously. Such properties open numerous complex numerical applications that are traditionally difficult for classical computers. Examples include artificial Intelligence, image processing and recognition, cryptography, or secure communications and so on.

Within an ion hyperfine electronic states (Zeeman split states) can be revealed by the use of a magnetic field and the different electron levels used as the different qubit states and electrons moved between the levels using microwave radiation or lasers.

In ion trap quantum computers surface ion traps are used to control ions used in quantum computation and surface electrodes are used to generate electric fields to manipulate and trap the ions suspended in free space. The surface electrode potentials of an ion-trap are in turn controlled by DACs. State-of-the-art quantum computers use many DACs of the same type, for example 16 bit DACs with a better than 1 MHz update rate.

SUMMARY

The performance of surface ion traps can be considered in terms of meeting requirements for noise, bandwidth, power and resolution and a DAC is chosen for use which best fits these requirements across the entire surface ion trap.

However, different functions performed by a quantum computer necessitate different requirements. For example, gate operations require DACs with a low noise and a low bandwidth whereas shuttling operations require faster DACs which can tolerate more noise.

Ion traps currently use the same DACs across the ion trap which have characteristics which suffice across the entire ion trap. They have sufficient bandwidth for the shuttling areas and low enough noise to allow the gate operations to be executed.

Meeting the various requirements for carrying out different functions with a single type of DAC is difficult, and requires a large amount of space, in addition to a significant portion of the power budget.

Therefore, there is a requirement for improved surface ion traps which can better realise the requirements of each function carried out in a quantum computer, whilst minimising power consumption and use of valuable space on the silicon chip.

According to the invention there is provided an ion trap comprising a plurality of electrodes and DACs, each electrode being controlled by a DAC, wherein a first set of DACs control the electrodes configured to trap an ion in a first area and a second set of DACs control the electrodes configured to trap an ion in a second area wherein the first set of DACs are configured to operate with low noise and the second set of DACs are configured to operate with a high bandwidth. By having different types of DACs for different area the DACs can be selected to have suitable characteristics for the purpose of the area in which they are located. The first set of DACs may be a different type of DAC from the second set of DACs.

The first set of DACs may be configured to operate with low noise and low bandwidth and the second set of DACs may be configured to operate with a high bandwidth but resultantly have a larger noise profile.

A low noise DAC may have less than 10 nV/rtHz or more particularly less than 5 nV/rtHz. A high bandwidth DAC may have a bandwidth of 1 million updates per second (1 MSPS).

By selecting a DAC for a specific area a DAC with the most suitable characterised may be selected. This also helps to minimise space because, in areas in which minimising noise is not so important, smaller DACs can be used. DACs with larger footprints may be used in areas where minimising noise is more critical.

There may be an additional set of electrodes also configured to trap ions in the first area, a third set of DACs and each additional electrode being controlled by one of the third set of DACs, the third set of DACs being configured to operate with high bandwidth and high noise. The additional electrodes may be interleaved with the plurality of electrodes. Thus the additional electrodes can be used for high speed applications and the original, first electrodes can be used for low noise and low bandwidth applications.

The first set of DACs may be the same type as the second set of DACs, each DAC having two modes of operation: a first mode with low noise and low bandwidth and a second mode with high noise and high bandwidth. Thus different modes of operation can be used for different applications.

Each DAC has an output and may comprise a first sub-DAC and a second sub-DAC, the output of the DAC being selected by one or more of an output switch connected to one or more of the sub-DACs, a power switch connected to one or more of the sub-DACs, and/or analogue summing of the sub-DACs.

The first sub-DAC may comprise capacitive architecture and the second sub-DAC may comprise resistive architecture. In particular, the first sub-DAC may have no, or minimal, resistive elements so that it operates with very low noise. The second sub-DAC may have no, or minimal capacitive elements. The second sub-DAC may therefore operate fast and occupy only a small area, but consequently generate more noise.

The first sub-DAC and the second sub-DAC may take different formats. The DAC may comprise a precision code portion for operating in the first mode with low noise and low bandwidth and a second fast code portion for operating in the second mode with high noise and high bandwidth, the surface ion trap further comprising a switch for switching between the precision code portion and the fast code portion.

The first mode may comprise a feedback loop which avoids drift in low noise, low bandwidth applications. The feedback loop may comprises a proportional integrative derivative controller configured to control the output to a reference output. The DAC may use selectable compensation and/or a variable gain stage.

The ion trap may be a surface ion trap.

According to the invention there is provided an ion trap quantum computer comprising an ion trap as described above.

According to the invention the DAC can be selected according to the purpose and design requirements (such as footprint size, noise and speed) of the region. There is a balance between the noise, the bandwidth, the power and the footprint size. For example, in gate regions in which noise reduction is important a low noise DAC may be used. Low noise DACs often have a larger footprint. Conversely, in shuttling areas only a small area may be available and a high bandwidth DAC may be used. There may be a higher noise associated with such a DAC but, in the shuttling areas, this may be acceptable.

BRIEF DESCRIPTION OF THE DRAWINGS

The invention will now be further and more particularly described, by way of example only, and with reference to the accompanying drawings, in which.

DETAILED DESCRIPTION

Figure 1:
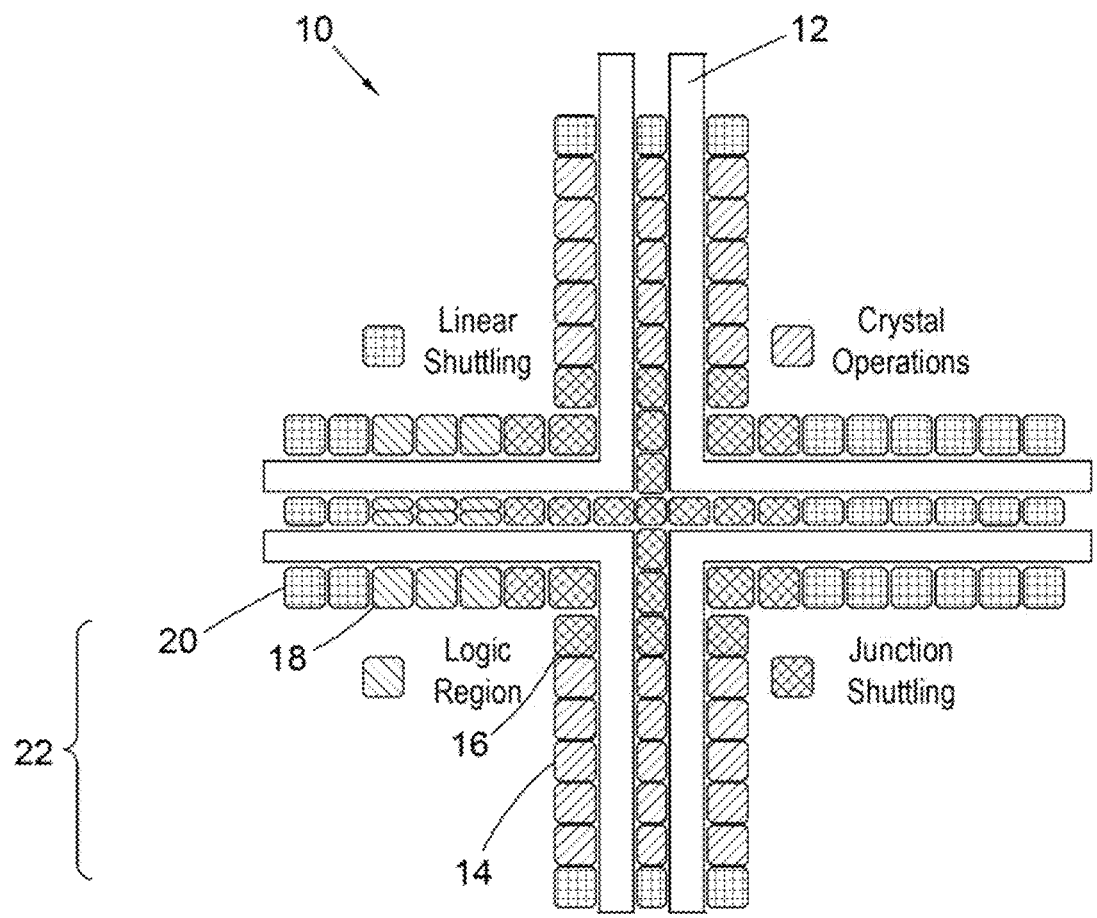
FIG. 1 shows a schematic representation of an x-junction device in a trapped ion quantum computer, with DACs tailored to the specific use for a given area.

The present invention enables the tailoring of DAC performance towards the specific requirements for use of a surface ion trap in a given area of a quantum computer. Referring to FIG. 1, there is an example depicting different DACs being used in different areas of a quantum computer, according to the present invention. FIG. 1 shows an x-junction device 12 in a trapped ion quantum computer 10. The x-junction device 12 is divided into areas. The areas of the x-junction device 12 can be divided into crystal operations 14, junction shuttling 16, logic region/gate zone 18 and linear shuttling 20 depending on the function being carried out in each area. Each area of the x-junction device 12 has different requirements for noise, bandwidth, drift, linearity, resolution and power consumption.

The x-junction 12 comprises a plurality of electrodes 22 configured to trap an ion in an area of the x-junction device 12. Each electrode 22 is driven by a DAC to carry out the function of the area of the x-junction device 12.

Dividing the x-junction device 12 into areas depending on the requirements for that area of the device facilitates the selection of a DAC which can achieve the best performance in each area of the device. Although an x shaped junction is depicted here, the junction does not need to be x shaped and could be divided into areas simply by function of the electrodes.

For example, the logic region 18 of the x-junction device 12 requires low noise and high resolution, and a 16-bit DAC with a low noise level—for example below 100 nV/rtHz and preferably below 10 nV/rtHz or in particular 5 nV/rtHz. The level can be selected to best meet the requirements in this area of the x-junction device 12. An example DAC would be AD5791 which has 20 bit resolution with a 7.5 nV/rtHz noise spectral density which is 7.5 µV RMS over 1 MHz bandwidth. The AD5791 settles within 1 µs to 0.02% and has a 1 MSPS update rate.

For low noise areas there may be a total RMS noise of <10 µV with a 10V full scale deflection over a period of 1 hour.

On the other hand, the linear shuttling 20 and junction shuttling 16 areas of the x-junction device 12 require high bandwidth and lower resolution. These areas may preferably have an update rate greater than 1 million updates per second. One example is an 8-bit DAC with a 100 MHz bandwidth which can be selected to most appropriately meet the requirements for electrode control in these areas of the device. An example DAC for the linear shuttling area or the junction shuttling may be a LTC1668 which has 10 ns settling with 50 MSPS update rate, 16 bit resolution and 50 pA/rtHz noise.

Dividing the x-junction device 12 into areas with sets of DACs configured to operate with certain performance characteristics can lower the power consumption of the quantum computer, whilst optimising the use of space on the silicon chip. However, shuttling will still occur in the logic region and it is therefore desirable to optimise the properties.

Figure 2:
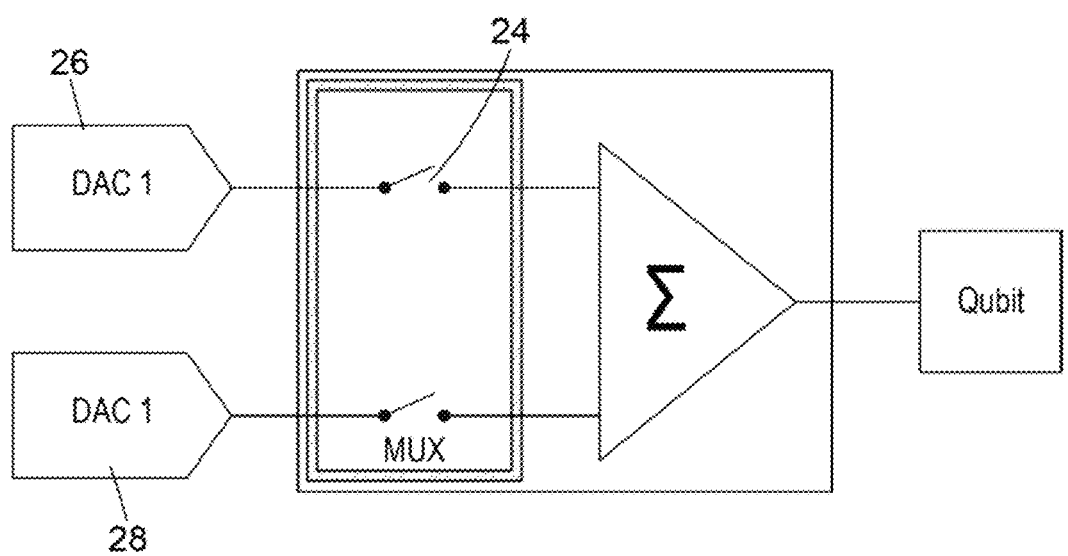
FIG. 2 shows a schematic representation of two DACs being used independently in the same area.

Referring to FIG. 2, there is a scheme for combining the effect of two different DACs in the same area. A scheme as shown in FIG. 2 can be used to achieve further increases in performance in surface ion traps which require a dual functionality such as shuttling speed and low noise quantum operations. A scheme as shown in FIG. 2 can be implemented in a gate zone/logic region 18 of a device for example, which requires shuttling in the gate-zone area, and therefore requires a high bandwidth for shuttling in addition to a low noise and high resolution.

FIG. 2 shows two DACs 26 and 28 with independent DAC outputs. A selection mechanism 24 enables the selection of a DAC which can best meet the requirements for the task to be performed, and can achieve the best control over the position of ions.

The first DAC 26 may have a capacitive architecture and thus be used for applications in which low noise is required. In particular, the first DAC has no resistive portion and therefore very quiet. The second DAC may have a resistive architecture and thus be used for application in which a high bandwidth is required.

The selection mechanism 24 enables the electric field at the ion position to be generated from either or both of the two independent DAC outputs.

The selection mechanism 24 can be, but is not limited to, an output which connects or disconnects the DACs as required; a power switch which enables or disables the DAC outputs as required; an analogue summing circuit with appropriately weighted DAC outputs; an e-field summing which divides the electrode area into two separate interleaved areas; or can be part of the DAC design itself such as in a hybrid DAC.

Alternatively or additionally, the selection mechanism 24 can be one or more of these mechanisms in combination.

Figure 3A:
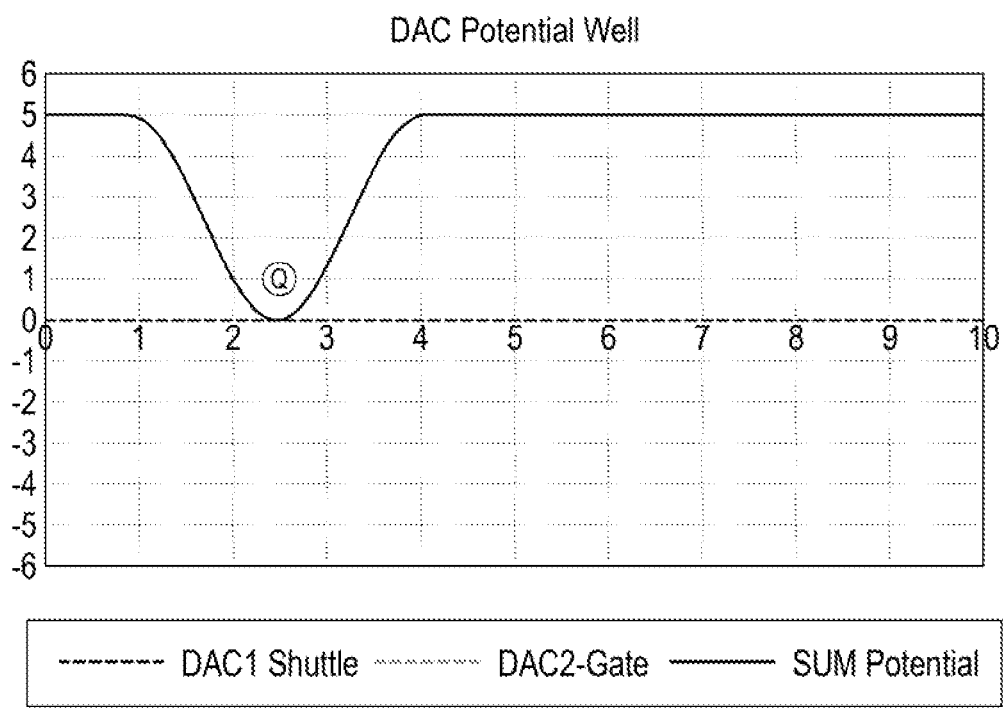
FIG. 3A depicts a potential energy plot for two DACs operating independently in the same area.
Figure 3B:
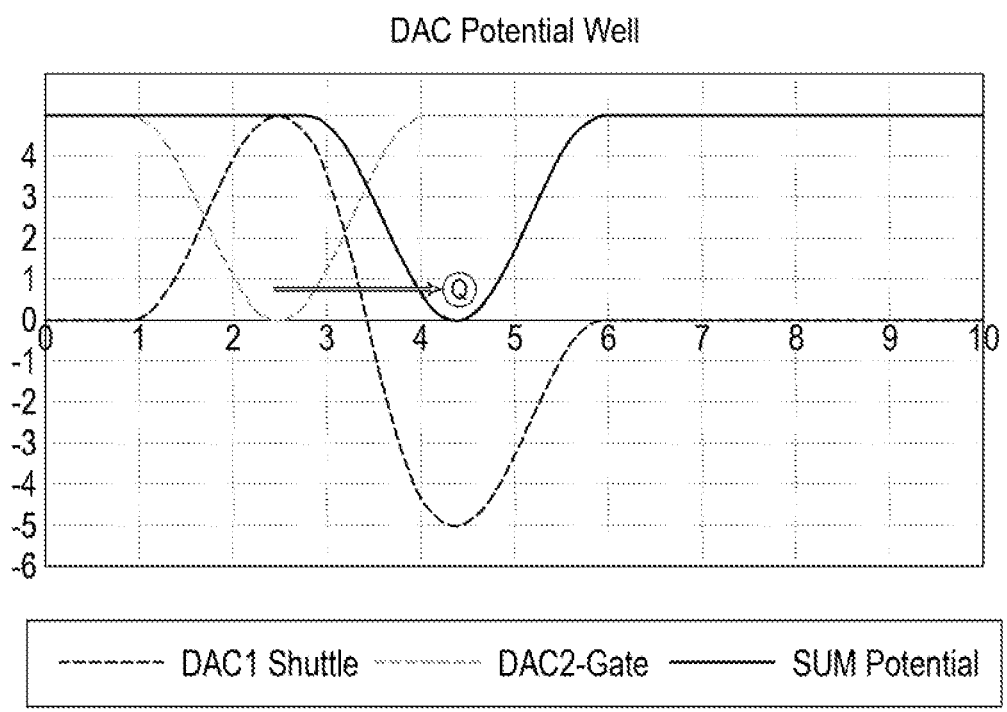
FIG. 3B depicts a potential energy plot for two DACs operating independently in the same area.

FIG. 3A and FIG. 3B depict potential energy plots for a scheme with two independently operable DACs as shown in FIG. 2. FIG. 3A depicts an example in which a first DAC 'DAC'1 is a high speed DAC and is set to 0V everywhere. A second DAC 'DAC 2', which is a low noise DAC results in a potential well in the sum potential in the gate-zone/logic region 18.

FIG. 3B shows the potential energy plot when shuttling into and out of the gate zone/logic region 18 is performed by adjusting the DAC 1 output. The sum potential shifts to the right. The potential well created by DAC 2 does not change, and as such there is no bandwidth requirement imposed on DAC 2.

In the example shown in FIG. 2, it is important that the performance of the DACs does not impede upon each other. When the selection mechanism 24 is an output switch, the DAC not in use can be temporarily switched off, or disconnected from the ion to avoid contribution of noise. Alternatively, a power switch can be used to de-power the DAC not in use. Alternatively, the DAC selection mechanism 24 can be included in the DAC design itself which can prevent the need to separately and independently silence the inactive DAC. DACs can have an internal switch which alters the DAC architecture and prevent the contribution of the DAC not in use.

In some embodiments, a switch is undesirable owing to switching noise or charge injection. DACs can be configured such that the noise output is code dependent, and the idle state during a quantum operation is at the lowest noise level. This is typical of DACs where the output noise is dominated by the input reference noise, and is therefore reduced with codes which produce smaller fractions of the reference as outputs.

Figure 4:
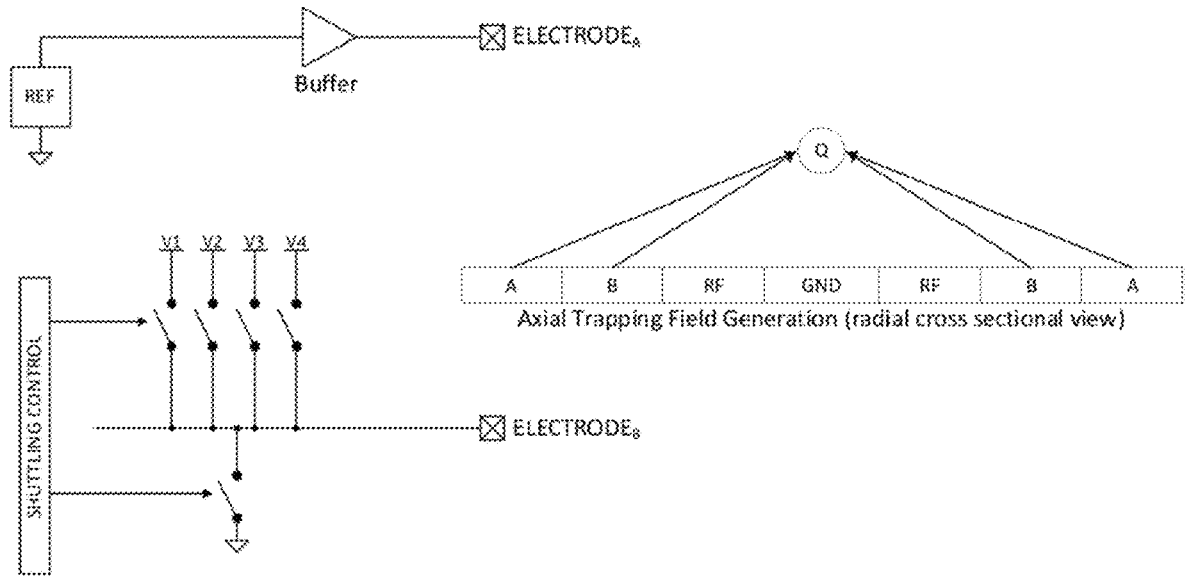
FIG. 4 shows a dual electrode scheme with the shuttling control DAC having a series of fast switches to references.

FIG. 4 shows a scheme in which a shuttling control DAC is implemented as a series of fast switches to references, and the gatezone DAC as a static filtered reference voltage. The electrodes are arranged so that the Qubit sees the field sum of the two outputs. By allowing the shuttling DACs to short the electrode to GND for output 0V, the noise on the potential well is minimized during the quantum operation.

Figure 5:
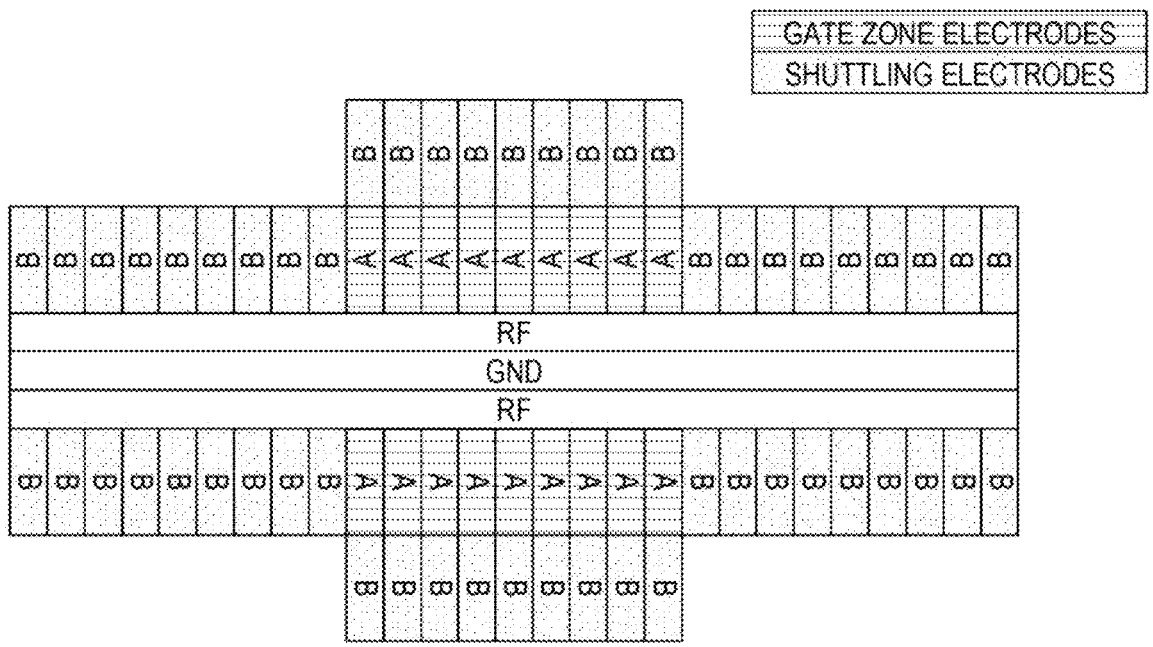
FIG. 5 shows a surface view of a surface ion trap with several pairs of axial electrodes.

FIG. 5 shows a surface view of the surface ion trap with several pairs of axial electrodes.

Figure 6:
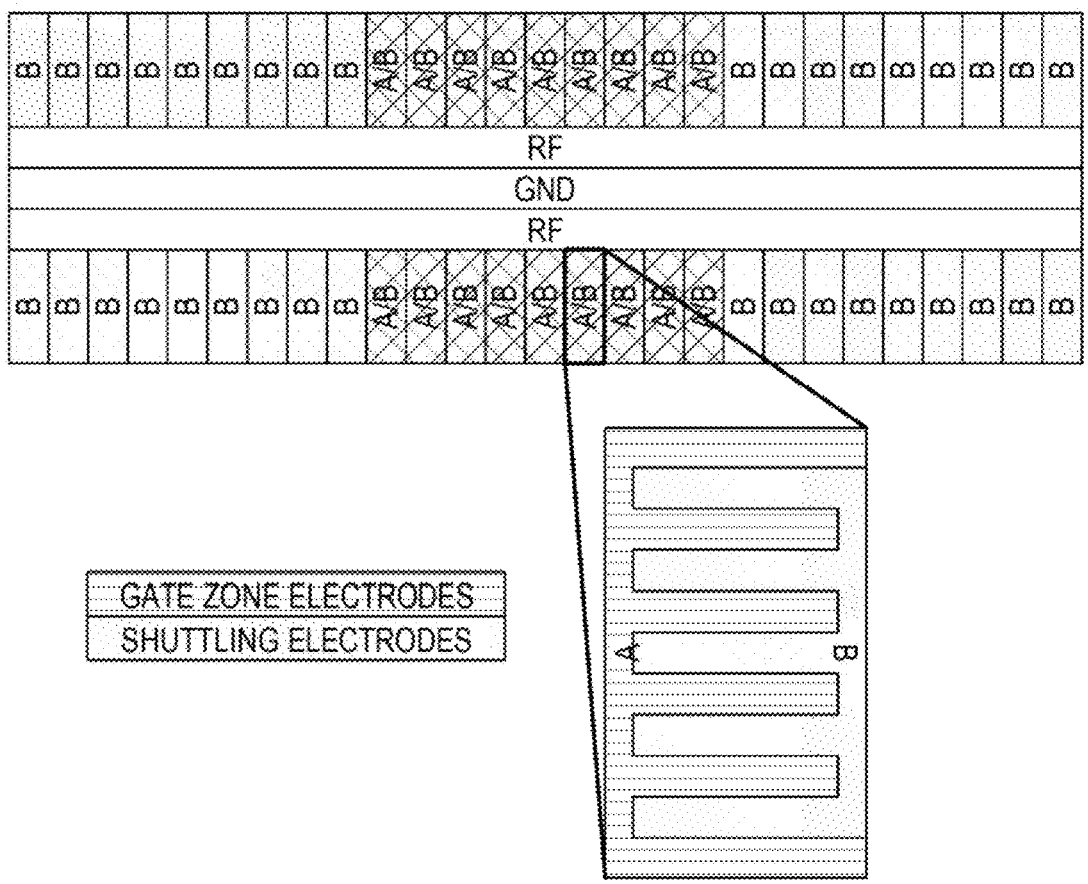
FIG. 6 shows a surface view of a surface ion trap with interleaved electrode pairs.

FIG. 6 shows a surface view of the surface ion trap with single axial position electrodes replaced with interleaved electrode pairs. Alternatively, any other arbitrary electrode shape which achieves the desired effect of summing the e-field at the ion may be used.

Figure 7:
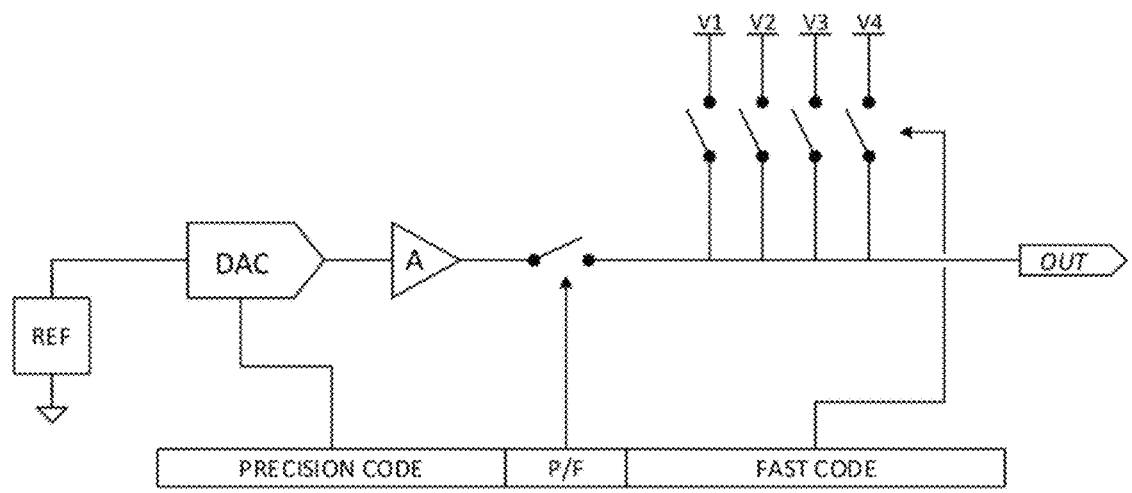
FIG. 7 shows a single hybrid DAC architecture for achieving precision or high speed.

FIG. 7 shows a scheme for a hybrid DAC with a bespoke architecture, in which the selection mechanism is included in the DAC design itself. FIG. 7 shows an example in which a location requires a precision or a high speed DAC at various times. A single hybrid DAC architecture is created by combining a precision code and a fast code.

Figure 8:
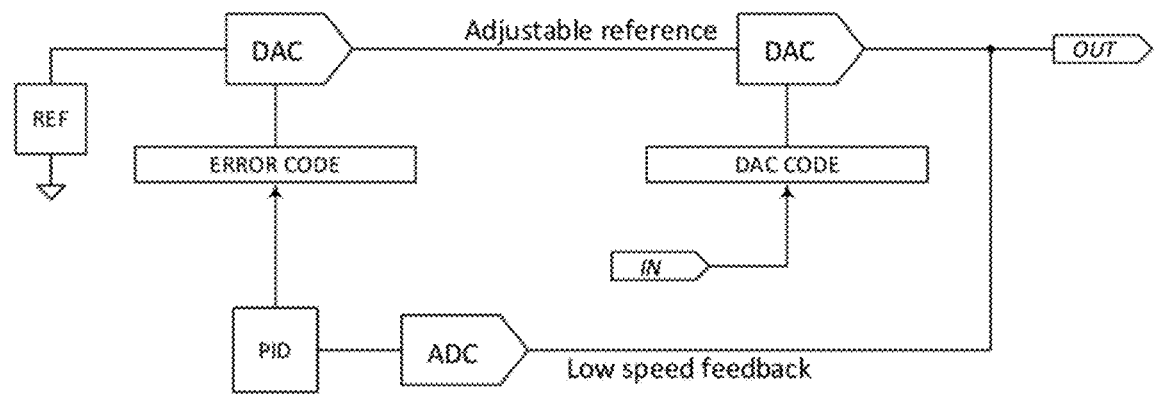
FIG. 8 shows a single hybrid DAC architecture for achieving high speed and low drift.

FIG. 8 shows another scheme for a hybrid DAC architecture, for a location which requires high speed or low drift at various times. This scheme includes a proportional integral derivative (PID) controller and a low speed feedback loop. The low speed feedback loop checks the level back to the reference input, and facilitates adjustment.

Where a low noise-bandwidth/high-speed device is required at different times, the bandwidth can be dynamically adjusted within the DAC output buffer.

Figure 9:
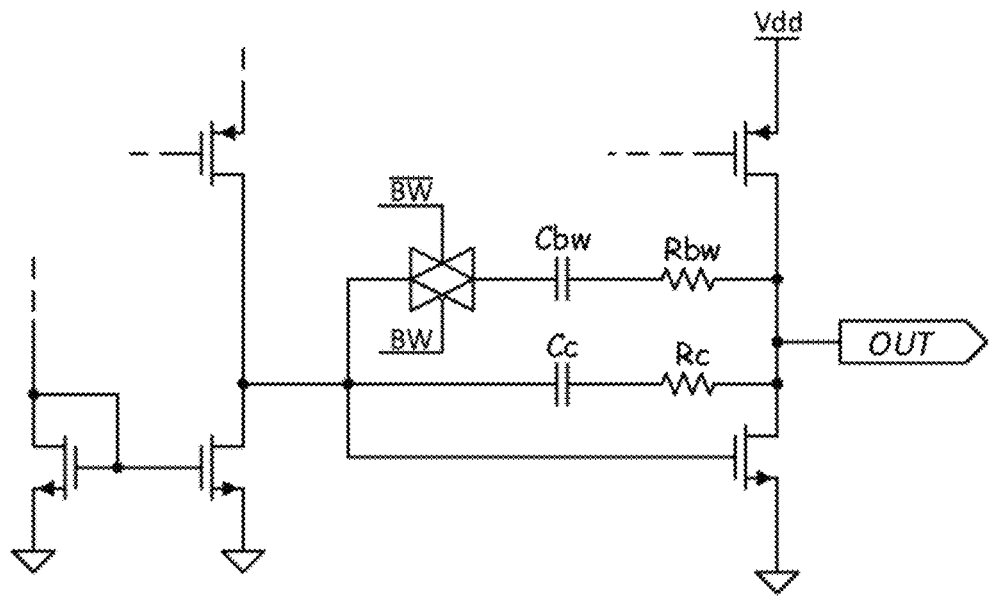
FIG. 9 shows a scheme for selectable compensation in the output stage.
Figure 10:
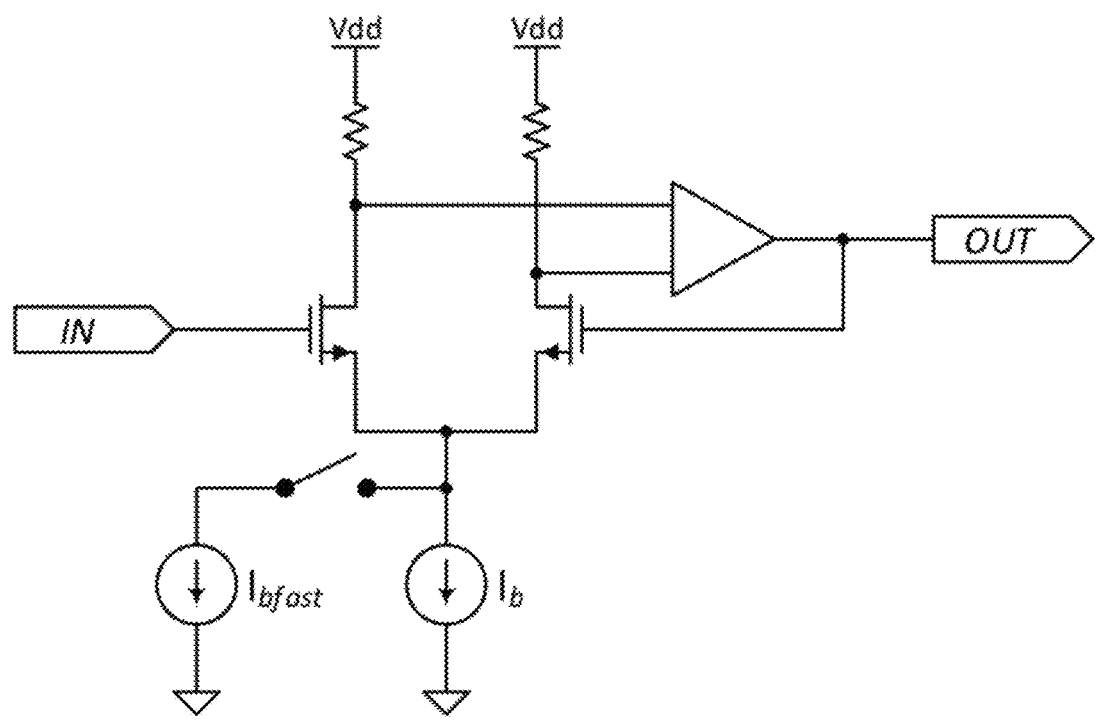
FIG. 10 shows a scheme for using a variable gain stage in the feedback loop.

FIG. 9 shows an additional scheme for a hybrid DAC architecture, using selectable compensation in the output stage. FIG. 10 shows a method using a variable gain stage in the feedback loop (using open loop gain of amplifier). This would also be possible using switchable filters.

Various further aspects and embodiments of the present invention will be apparent to those skilled in the art in view of the present disclosure.

"And/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

What is claimed is:

1. An ion trap comprising a plurality of electrodes and DACs, each electrode being controlled by a DAC, wherein a first set of DACs controls the electrodes configured to trap an ion in a first area and a second set of DACs controls the electrodes configured to trap an ion in a second area, and wherein the first set of DACs is configured to operate with low noise and the second set of DACs is configured to operate with a high bandwidth.

2. An ion trap according to claim 1, wherein the first set of DACs is configured to operate with low noise and low bandwidth and the second set of DACs is configured to operate with a high bandwidth and high noise.

3. An ion trap according to claim 1, wherein the first set of DACs is a different type of DAC from the second set of DACs.

4. An ion trap according to claim 1, further comprising:
an additional set of electrodes also configured to trap ions in the first area; and
a third set of DACs,
wherein each of the third set of DACs is configured to control an electrode of the additional set of electrodes, and wherein the third set of DACs is configured to operate with high bandwidth and high noise.

5. An ion trap according to claim 4, wherein the additional electrodes are interleaved with at least some of the plurality of electrodes.

6. An ion trap according to claim 1, wherein the first set of DACs is the same type of DAC as the second set of DACs, and wherein each DAC in the first set of DACs and second set of DACs comprises two modes of operation: a first mode with low noise and low bandwidth and a second mode with high noise and high bandwidth.

7. An ion trap according to claim 6, wherein each DAC in the first set of DACs and second set of DACs comprises an output, a first sub-DAC, and a second sub-DAC, and wherein one or more of (i) an output switch connected to one or more of the sub-DACs, (ii) a power switch connected to the one or more of the sub-DACs, or (iii) an analogue summing of the sub-DACs is configured to select the output.

8. An ion trap according to claim 7, wherein the first sub-DAC comprises capacitive architecture and the second sub-DAC comprises resistive architecture.

9. An ion trap according to claim 6, wherein each DAC in the first set of DACs and second set of DACs comprises a precision code portion for operating in the first mode with low noise and low bandwidth and a second fast code portion for operating in the second mode with high noise and high bandwidth, the ion trap further comprising a switch for switching between the precision code portion and the fast code portion.

10. An ion trap according to claim 6, wherein the first mode comprises a feedback loop.

11. An ion trap according to claim 10, wherein the feedback loop comprises a proportional integrative derivative controller configured to control the output to a reference output.

12. An ion trap according to claim 10, wherein the feedback loop comprises a variable gain stage.

13. An ion trap according to claim 6, wherein each DAC in the first set of DACs and a second set of DACs uses selectable compensation.

14. An ion trap according to claim 1, wherein the ion trap is a surface ion trap.

15. An ion trap quantum computer comprising:
an ion trap comprising a plurality of electrodes and DACs, each electrode being controlled by a DAC, wherein a first set of DACs controls the electrodes configured to trap an ion in a first area and a second set of DACs controls the electrodes configured to trap an ion in a second area, and wherein the first set of DACs is configured to operate with low noise and the second set of DACs is configured to operate with a high bandwidth.

* * * * *